(12) United States Patent
Corrigan

(10) Patent No.: US 6,480,634 B1
(45) Date of Patent: Nov. 12, 2002

(54) IMAGE PROJECTOR INCLUDING OPTICAL FIBER WHICH COUPLES LASER ILLUMINATION TO LIGHT MODULATOR

(75) Inventor: Robert W. Corrigan, Los Altos, CA (US)

(73) Assignee: Silicon Light Machines, Sunnyvale, CA (US)

( * ) Notice: Subject to any disclaimer, the term of this patent is extended or adjusted under 35 U.S.C. 154(b) by 0 days.

(21) Appl. No.: 09/574,733

(22) Filed: May 18, 2000

(51) Int. Cl.⁷ .................. G02B 6/42; G02B 27/10; G02F 1/295

(52) U.S. Cl. .............. 385/4; 385/31; 385/116; 359/618

(58) Field of Search ............ 385/115, 116, 385/1–3, 4, 33; 353/30, 31, 122, 72; 359/618, 627

(56) References Cited

U.S. PATENT DOCUMENTS

| 5,208,891 | A | * | 5/1993 | Prysner ................. 385/116 |
| 5,663,817 | A | * | 9/1997 | Frapin et al. ............. 349/5 |
| 5,704,700 | A | * | 1/1998 | Kappel et al. ............ 353/31 |
| 5,802,222 | A | * | 9/1998 | Rasch et al. ............. 385/1 |
| 6,219,015 | B1 | * | 4/2001 | Bloom et al. ............ 345/87 |

* cited by examiner

Primary Examiner—Rodney Bovernick
Assistant Examiner—Juliana K. Kang
(74) Attorney, Agent, or Firm—Haverstock & Owens LLP

(57) ABSTRACT

An image projector projects an image onto a display screen and includes a laser source unit, an optical fiber, and a projector head. The projector head includes a light modulator and an optical projection arrangement. The optical fiber couples a laser illumination to the light modulator of the projector head from the laser source unit. The light modulator modulates the laser illumination to produce an array of pixels. The optical projection arrangement projects the array of pixels onto the display screen to produce the image on the display screen. Preferably, the image projector is a color image projector. In the color image projector, the laser source unit includes red, green, and blue lasers, which illuminate first, second, third light modulators. The first, second, and third light modulators produce red, green, and blue arrays of pixels, which the optical projection arrangement projects onto the display screen to produce a color image.

29 Claims, 5 Drawing Sheets

| FIG. 6A | FIG. 6B |
FIG. 6
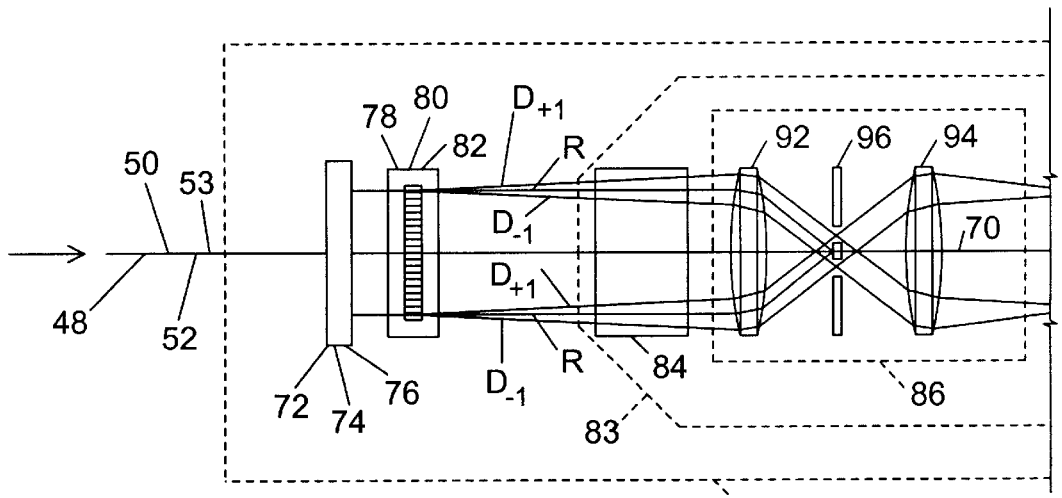
FIG. 6A
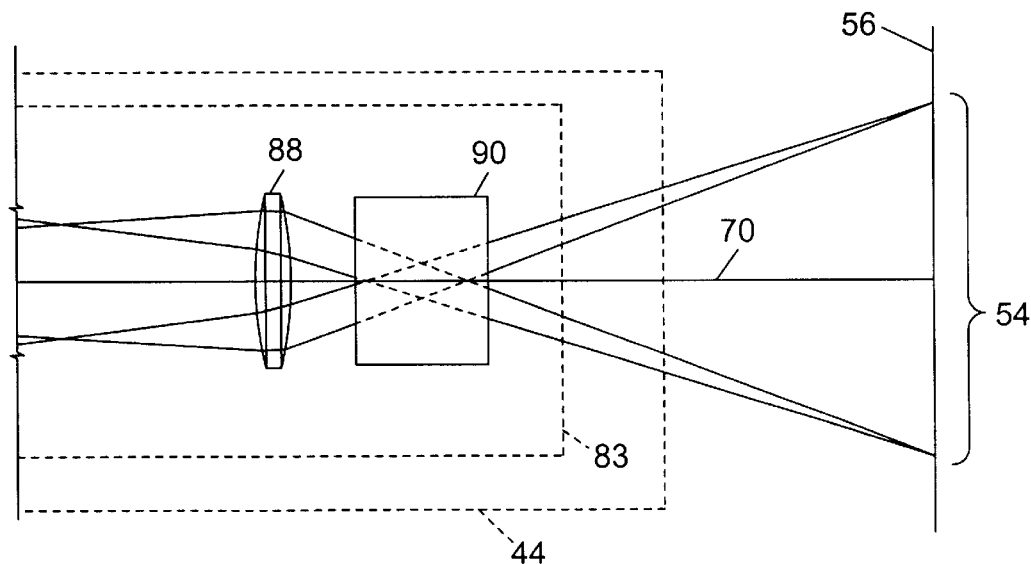
FIG. 6B

IMAGE PROJECTOR INCLUDING OPTICAL FIBER WHICH COUPLES LASER ILLUMINATION TO LIGHT MODULATOR

FIELD OF THE INVENTION

This invention relates to the field of image projectors. More particularly, this invention relates to the field of image projectors in which a laser illuminated light modulator produces an array of pixels and in which the array of pixels is projected onto a display screen.

BACKGROUND OF THE INVENTION

In recent years, light modulators have been developed using MEMS (micro-electro-mechanical systems) technology in which moveable elements are configurable to direct light. An example of such light modulators is a grating light valve (GLV) taught in U.S. Pat. No. 5,311,360 to Bloom et al., in which the GLV is configurable in a reflecting mode and a diffracting mode. The GLV taught by Bloom et al. is isometrically illustrated in FIG. 1. The GLV 10 includes moveable elongated elements 12 suspended over a substrate 14.

A first side view of the GLV 10 of the prior art is illustrated in FIG. 2A, which shows the GLV 10 in the reflecting mode. The moveable elongated elements 12 each include a first reflective coating 16. Interspersed between the moveable elongated elements 12 are second reflective coatings 18. In the reflecting mode, upper surfaces of the first and second reflective coatings, 16 and 18, are separated by a height difference of a half wavelength $\lambda/2$ of incident light I. The incident light I reflecting from the second reflecting coatings 18 travels a full wavelength further than the incident light I reflecting form the first reflecting coatings 16. So the incident light I, reflecting from the first and second reflecting coatings, 16 and 18, constructively combines to form reflected light R. Thus, in the reflecting mode, the GLV 10 produces the reflected light R.

A second side view of the GLV 10 of the prior art is illustrated in FIG. 2B, which shows the GLV in the diffracting mode. To transition from the reflecting mode to the diffracting mode, an electrostatic potential between the moveable elongated elements 12 and the substrate 14 moves the moveable elongated elements 12 to contact the substrate 14. To maintain the diffracting mode, the electrostatic potential holds the moveable elongated elements 12 against the substrate 14. In the diffracting mode, the upper surfaces of the first and second reflective coatings, 16 and 18, are separated by a quarter wavelength $\lambda/4$ of the incident light I. The incident light I reflecting from the second reflecting surfaces 18 travels a half wavelength further than the incident light I reflecting from the first reflective coatings 16. So the incident light I, reflecting from the first and second reflecting coatings, 16 and 18, destructively interferes to produce diffraction. The diffraction includes a plus one diffraction order $D_{+1}$ and a minus one diffraction order $D_{-1}$.

Thus, in the diffracting mode, the GLV 10 produces the plus one and minus one diffraction orders, $D_{+1}$ and $D_{-1}$.

A first alternative GLV of the prior art is illustrated in FIGS. 3A and 3B. The first alternative GLV 10A includes first elongated elements 22 interdigitated with second elongated elements 23. The first elongated elements 22 include third reflective coatings 26; the second elongated elements 23 include fourth reflective coating 28. In the reflecting mode, illustrated in FIG. 3A, the third and fourth reflective coatings, 26 and 28, are maintained at the same height to produce the reflected light R. In the diffracting mode, illustrated in FIG. 3B, the first and second reflected coatings, 26 and 28, are separated by the second height difference of the quarter wavelength $\lambda/4$ of the incident light I to produce the diffraction including the plus one and minus one diffraction orders, $D_{+1}$ and $D_{-1}$.

A display system utilizing a GLV is taught in U.S. Pat. No. 5,982,553 to Bloom et al. The display system includes red, green, and blue lasers, a dichroic filter group, illumination optics, the GLV, Schlieren optics, projection optics, a scanning mirror, and display electronics, which project a color image onto a display screen. The red, green, and blue lasers, driven by the display electronics and coupled to the GLV (via the dichroic filter group and the illumination optics) sequentially illuminate the GLV with red, green, and blue illuminations. The GLV, driven by the display electronics, produces a linear array of pixels which changes with time in response to a signal from the display electronics, each pixel configured in the reflecting mode or the diffracting mode at a given instant in time. Thus, the GLV produces sequential linear arrays of red, green, and blue pixels with each of the red, green, and blue pixels in the reflecting mode or the diffracting mode.

The red, green, and blue pixels are then coupled to the Schlieren optics which blocks the reflecting mode and allows at least the plus one and minus one diffraction order, $D_{+1}$ and $D_{-1}$, to pass the Schlieren optics. Thus, after passing the Schlieren optics, the linear arrays of the red, green, and blue pixels have light pixels corresponding to the pixels at the GLV in the diffracting mode and dark pixels corresponding to pixels at the GLV in the reflecting mode. The projection optics (via the scanning mirror) project the linear arrays of the red, green, and blue pixels onto the display screen while the scanning mirror, driven by the display electronics, scans the linear arrays of the red, green, and blue pixels across the display screen. Thus, the display system produces a two dimensional color image on the display screen.

An alternative display system utilizing the GLV includes the red, green, and blue lasers; red, green, and blue illumination optics; first, second, and third GLVs; the dichroic filter group; the projection optics; the scanning mirror; and the display electronics. The red, green, and blue lasers, via the red, green, and blue illumination optics, illuminate the first, second, and third GLVs, respectively. The first, second, and third GLVs produce the linear arrays of the red, green, and blue pixels, respectively, in response to signals from the display electronics. The dichroic filter group directs the linear arrays of the red, green, and blue pixels to the Schlieren optics, which allows at least the plus one and minus one diffraction order, $D_{+1}$ and $D_{-1}$, to pass the Schlieren optics. The projection optics, via the scanning mirror, project the linear arrays of the red, green, and blue pixels onto the display screen while the scanning mirror, driven by the display electronics, scans the linear arrays of the red, green, and blue pixels across the display screen. Thus, the alternative display system produces the two dimensional color image on the display screen.

Examples of applications for a GLV based display system include a home entertainment system, a boardroom application, and a cinema application among others. In the home entertainment system or the boardroom application, the GLV based display system projects the two dimensional color image onto the display screen located on a wall. In the cinema application, the GLV based display system projects the two dimensional color image from a display booth onto a cinema screen.

In the home entertainment system, the boardroom application, and the cinema application, the red, green, and blue lasers are bulky and, thus, take up space. Further, the red, green, and blue lasers generate heat and, thus, require cooling by a cooling apparatus. Moreover, power supplies for the red, green, and blue lasers as well as the cooling apparatus generates noise and vibration. Additionally, precise coming and control are required between laser electronics and projection electronics in such systems.

It is theorized that as a cinema house transitions from a film based projector to the GLV based display system, the cinema house will want to maintain the film based projector in the projection booth while adding the GLV based display system. Thus, in the cinema application the problem of space is an exceptionally difficult problem since there is generally not much extra room in the display booth to accommodate the GLV based display system while keeping the film based projector.

In addition, in the display system utilizing the GLV, configuring the illumination optics is geometrically difficult due to limited geometrical space for the illumination optics, the GLV, and the Schlieren optics. Very precise mechanical tolerances must be maintained between each of these parts. These problems are exacerbated in the alternative display system utilizing the GLV by a factor of three due to the red, green, and blue illumination optics illuminating the first, second, and third GLVs.

What is needed is a method of reducing the problems of space, heat, noise, and vibration in the home entertainment system, the boardroom application, and the cinema application. What is further needed is a method for adding a GLV based display system to a projection booth in a cinema application while keeping a film based projector in the projection booth.

What is needed is a method of reducing the problem of limited geometrical space for illumination optics illuminating a GLV in a single GLV based display system. What is further needed is a method of reducing the problem of limited geometrical space for illumination optics illuminating three GLVs in a three GLV based display system. Further, what is needed is a system that allows decoupling of the number of mechanical components which must be held within tight tolerances with respect to each other.

SUMMARY OF THE INVENTION

The present invention is an image projector which projects an image onto a display screen. The image projector includes a laser source unit, an optical fiber, and a projector head. The projector head includes a light modulator and an optical projection arrangement. The optical fiber couples a laser illumination to the light modulator of the projector head from the laser source unit. The light modulator modulates the laser illumination to produce an array of pixels. The optical projection arrangement projects the array of pixels onto the display screen to produce the image on the display screen.

Preferably, the image projector is a color image projector. In the color image projector, the laser source unit includes red, green, and blue lasers. The projector head of the color image projector preferably includes first, second, and third GLVs (grating light valves), and the optical projection arrangement. First, second, and third optical fibers couple the red, green and blue lasers of the laser source unit to the first, second, and third GLVs of the projector head. Preferably, the optical projection arrangement includes combining optics, separating optics, a projection lens, and a scanning mirror.

In operation the red, green, and blue lasers produce red, green, and blue laser illumination, which illuminate the first, second, and third GLVs. The first, second, and third GLVs modulate the red, green, and blue laser illuminations to produce red, green, and blue linear arrays of pixels. The red, green, and blue linear arrays of pixels include a diffracting mode and a reflecting mode. The separating optics allow at least plus one and minus one diffraction orders of the diffracting mode to pass the separating optics while blocking the reflecting mode. The projection lens, via the scanning mirror, projects the red, green, and blue linear arrays of pixels onto the display screen. The red, green, and blue linear arrays of pixels produce a color linear array of pixels on the display screen. The scanning mirror scans the red, green, and blue linear arrays of pixels across the display screen to produce a color image on the display screen.

BRIEF DESCRIPTION OF THE DRAWINGS

FIG. 6 illustrates an elevation view, unfolded along an optic axis, of the projector head of the present invention and the display screen.

DETAILED DESCRIPTION OF THE PREFERRED EMBODIMENT

Figure 1:
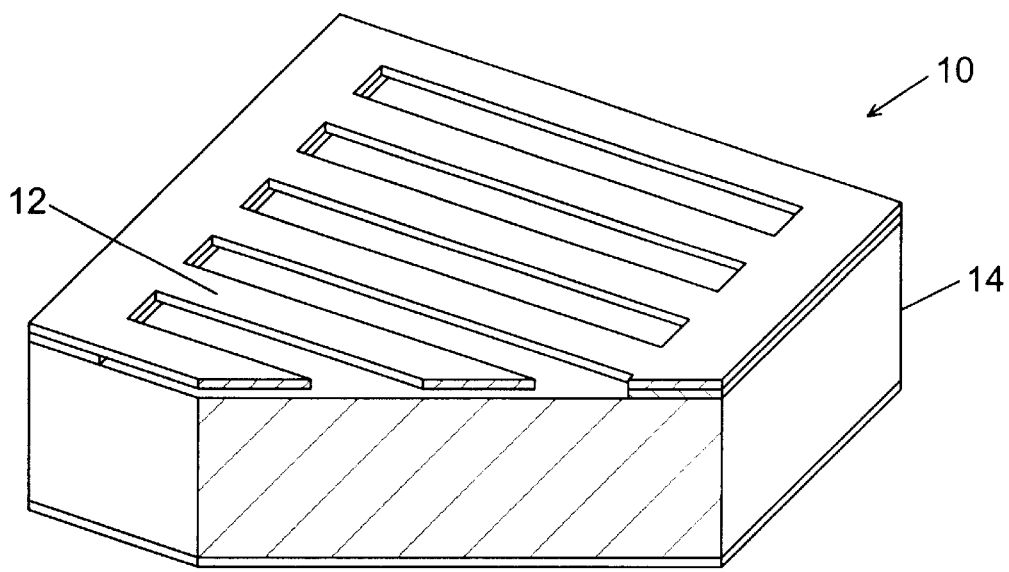
FIG. 1 illustrates an isometric view of a grating light valve (GLV) of the prior art.
Figure 2A:
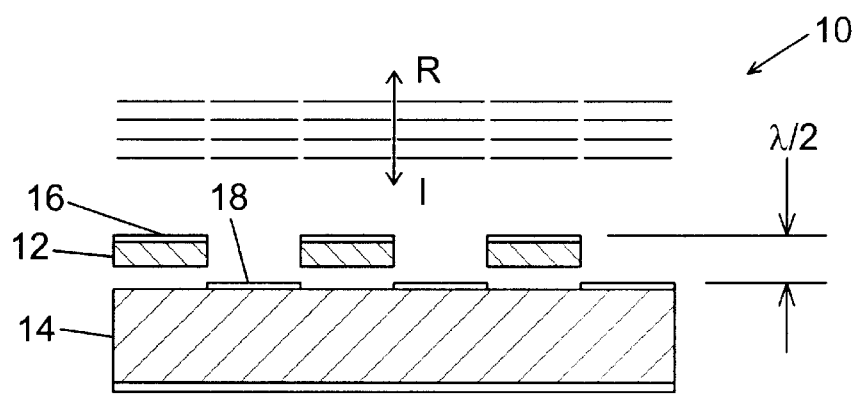
FIG. 2 illustrates a side view of the GLV of the prior art.
Figure 2B:
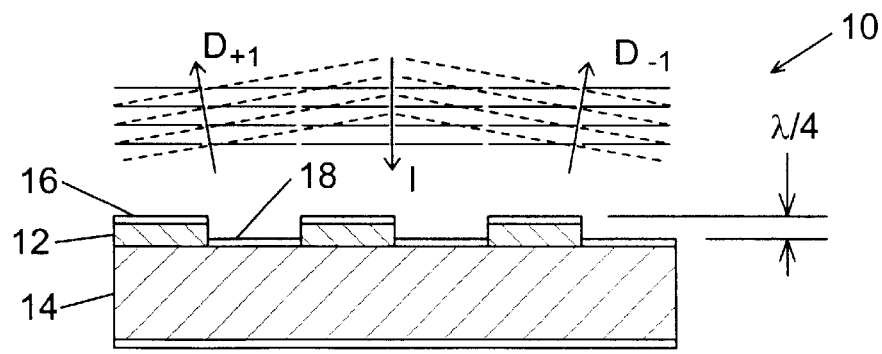
Figure 3A:
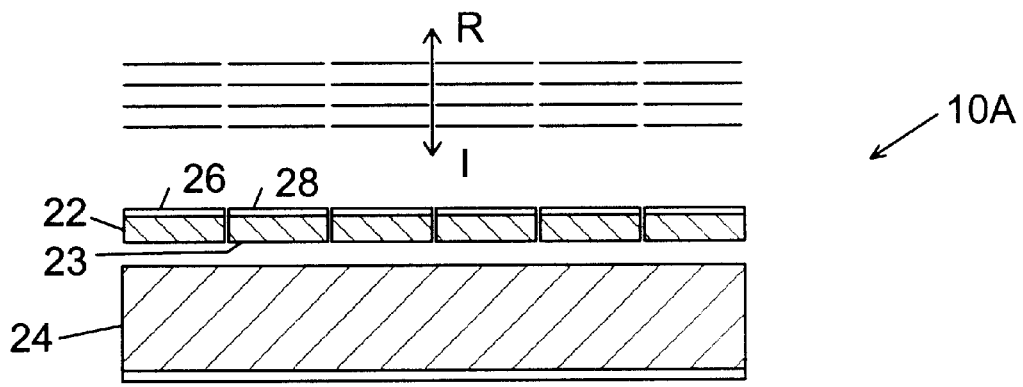
FIG. 3 illustrates a side view of an alternative GLV of the prior art.
Figure 3B:
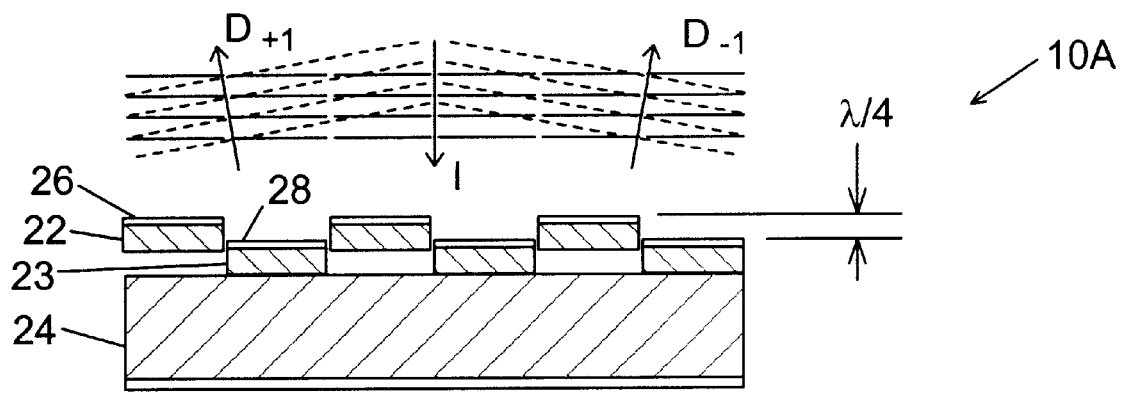
Figure 4:
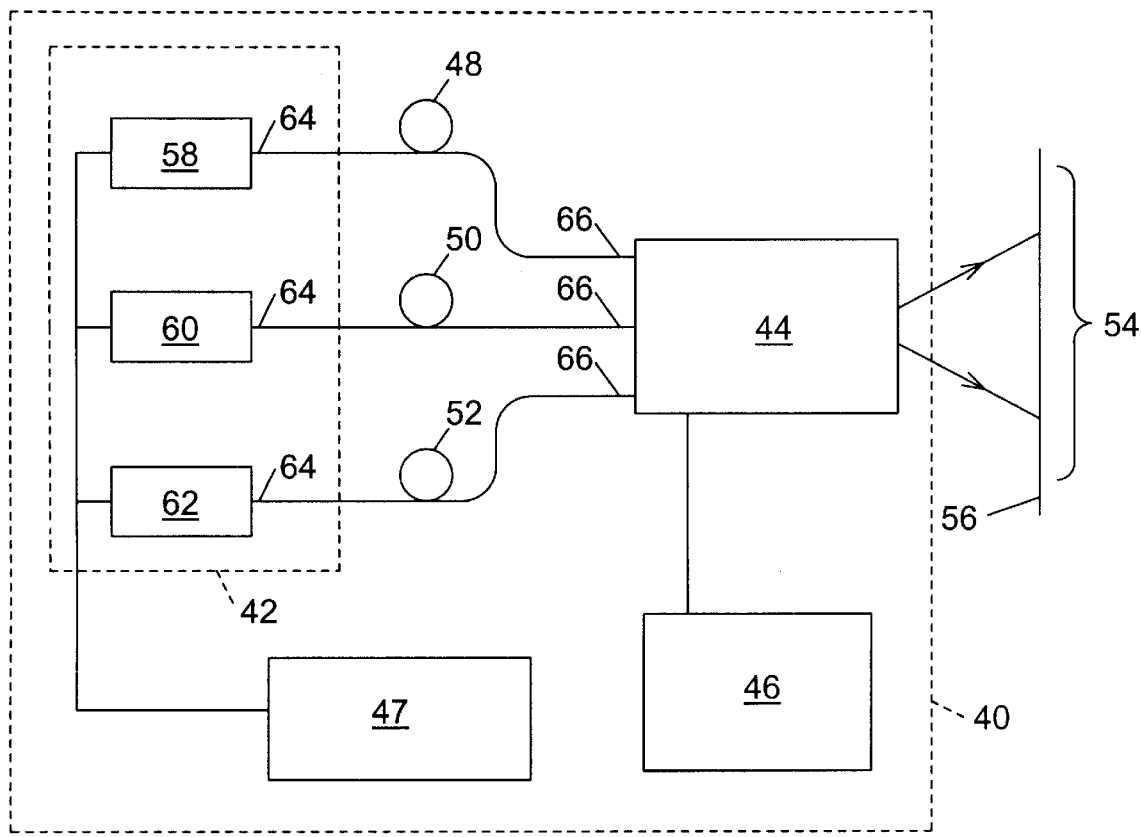
FIG. 4. schematically illustrates a color image projector of the present invention.

A color image projector of the present invention is schematically illustrated in FIG. 4. The color image projector 40 includes a laser source unit 42, a projector head 44, projector electronics 46, laser electronics 47 and first, second, and third optical fibers, 48, 50, and 52. The color image projector 40 projects a color image 54 onto a display screen 56. The laser source unit 42 includes red, green, and blue lasers, 58, 60, and 62. The red, green, and blue lasers, 58, 60, and 62, are coupled to the projector head 44 by the first, second, and third optical fibers, 48, 50, and 52, respectively. An upstream end 64 of each of the first, second, and third optical fiber, 48, 50, and 52, is coupled to the red, green, and blue lasers, 58, 60, and 62, respectively. A downstream end 66 of each of the first, second, and third optical fibers, 48, 50, and 52, is coupled to the projector head 44. The projector electronics 46 are coupled to control the projector head 44. The laser electronics 47 are coupled to control the red, green, and blue lasers, 58, 60, and 62. Forming the projector electronics 46 and the laser electronics 47 as separate electronic systems obviates the need for complex synchronization among the electronic circuitry. It is possible that the projector electronics 46 and the laser electronics 47 could be incorporated into a single electronic system.

The laser electronics 47 drives the red, green, and blue lasers, 58, 60, and 62, to produce red, green, and blue laser illuminations, respectively. The first, second, and third optical fibers, 48, 50, and 52, couple the red, green, and blue laser illuminations, respectively, to the projector head 44. The projector head 44 modulates the red, green, and blue laser illuminations to produce arrays of red, green, and blue pixels. The projector head 44 projects the red, green, and blue arrays of pixels onto the display screen 56 to produce the color image 54.

In a home entertainment system, the laser source unit 42 may be located in an electronic rack and the projector head 44 mounted to a ceiling. Alternatively, in the home entertainment system, the projector head 44 sits on a table and is housed in an attractive box. In a boardroom application, the laser source unit 42 is located separately from the projector head 44, which is preferably mounted to the ceiling. For both the home entertainment system and the boardroom application, the projector head 44 projects the color image 54 onto the display screen 56, which is preferably located near a wall in order to provide for maximum viewing.

In a cinema application, the projector head is located in a projection booth and the display screen 56 is a cinema screen. In the cinema application, the laser source unit 42 is preferably located in a separate room. Alternatively, in the cinema application, the laser source unit 42 is located on a roof of a cinema house or the laser source unit 42 is a separate laser source unit located away from the cinema house.

Separating the laser source unit 42 from the projector head 44 eliminates problems of space, noise, and vibration associated with prior art projectors. Further, separating the laser source unit 42 from the projector head 44 allows placement of both a conventional projector and the projector head 44 within the projector booth of the cinema application. This allows greater flexibility to the cinema house so that the cinema house can project a film based movie using the conventional projector or an electronic based movie using the projector head 44, from a single projector booth.

Preferably, the first, second, and third optical fibers, 48, 50, and 52, are coupled to the red, green, and blue lasers, 58, 60, and 62, respectively, using fiber splices. Alternatively, the first, second, and third optical fibers 48, 50, and 52, are coupled to the red, green, and blue lasers, 58, 60, and 62, respectively using optical couplers. Preferably, the first, second and third optical fibers, 48, 50, and 52, are coupled to the projector head 44 using optical couplers. Alternatively, the first, second, and third optical fibers, 48, 50, and 52 are coupled to the projector head 44 using fiber splices.

Preferably, at the present time, the laser source unit 42 is located within about 30 meters of the projector head 44 in order to reduce optical absorption in the first, second, and third optical fibers, 48, 50, and 52. At the present time, the optical absorption in the third optical fiber 52, which couples the blue laser illumination to the projector head 44, presents a greater challenge than the optical absorption in the first or second optical fibers, which couple the red and green laser illuminations to the projector head 44. This is because developments in optical fiber technology have been driven by optical communications technology, which is not limited to visible light. At an early phase in the development of the optical communication technology it was recognized that silica optical fibers have attenuation minimums at about 1300 and 1550 nm. Thus, current low attenuation fibers operate in the near infrared, which is closest to the red illumination and which is closer to the green illumination compared to the blue illumination. In the future, it is anticipated that fiber technology will be develop for visible light so that the laser source unit 42 and the projector head 44 of the present invention can be separated by hundreds of meters with negligible attenuation.

Figure 5:
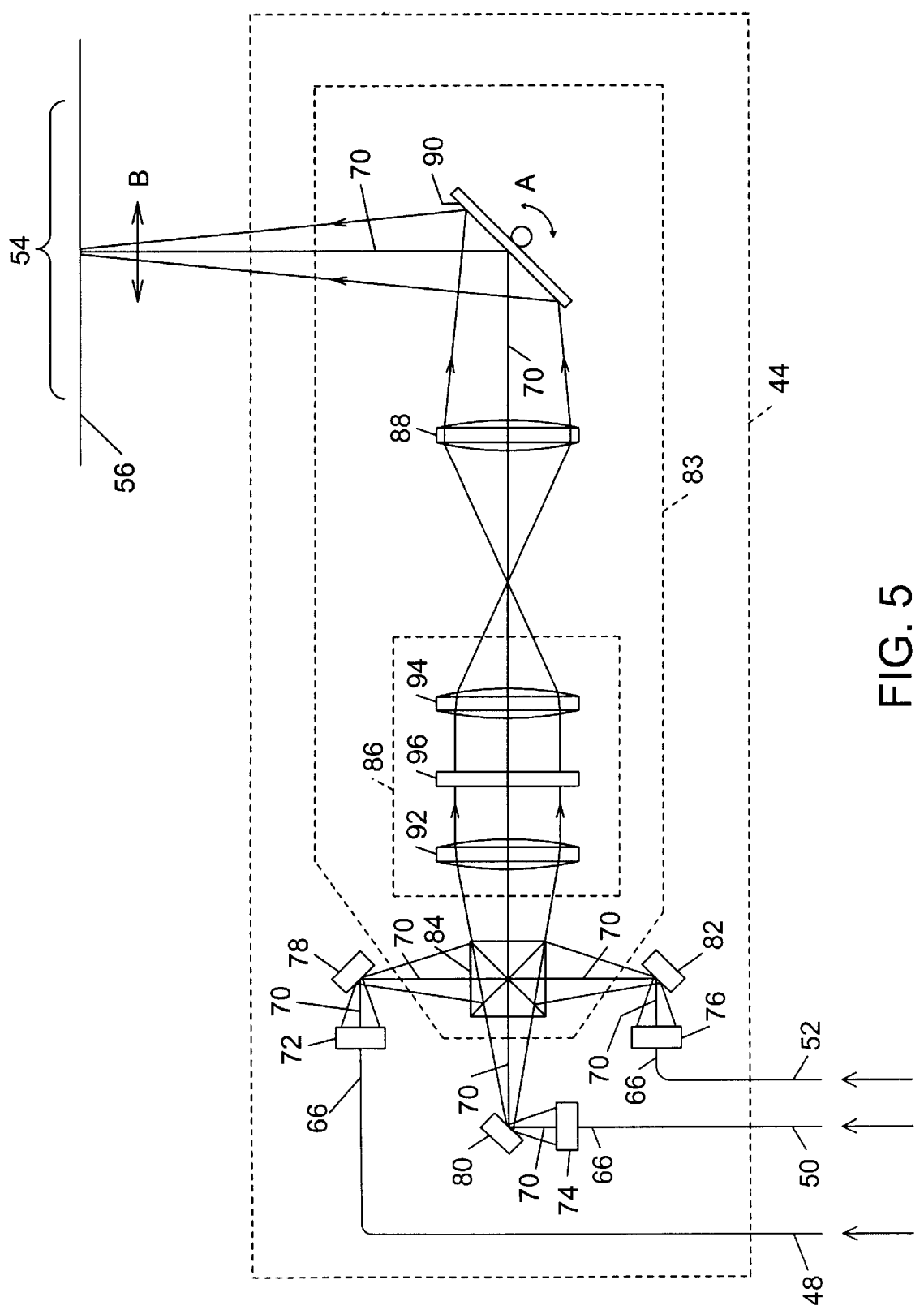
FIG. 5 illustrates a plan view of a projector head of the present invention and a display screen.

The projector head 44 and the display screen 56 are further illustrated in FIGS. 5 and 6. FIG. 5 illustrates a plan view of the projector head 44 and the display screen 56. FIG. 6 illustrates an elevation view of the projector head 44 and the display screen 56, with the projector head 44 and the display screen 56 unfolded along an optic axis 70.

The projector head 44 preferably includes first, second, and third micro-lens arrays, 72, 74, and 76, first, second, and third GLVs (grating light valves), 78, 80, and 82, and a optical projection arrangement 83. The first, second, and third optical fibers, 48, 50, and 52, are coupled to the first, second, and third micro-lens arrays, 72, 74, and 76, respectively. The first, second, and third micro-lens arrays, 72, 74, and 76, are optically coupled to the first, second, and third GLVs, 78, 80, and 82, respectively. The optical projection arrangement optically couples the first, second, and third GLVs, 78, 80, and 82, to the display screen 56.

Note, in the interest of clarity, that FIG. 6 illustrates the first, second, and third micro-lens arrays, 72, 74, and 76, as a single micro-lens array and that FIG. 6 illustrates the first, second, and third GLVs, 78, 80, and 82, as a single GLV.

The first, second, and third optical fibers, 48, 50, and 52, couple the red, green, and blue laser illuminations 53 to the first, second, and third micro-lens arrays, 72, 74, and 76, respectively. The first, second, and third micro-lens arrays, 72, 74, and 76, couple the red, green, and blue laser illuminations to the first, second, and third GLVs, 78, 80, and 82. The first, second, and third GLVs, 78, 80, and 82, are driven by the projector electronics and modulate the red, green, and blue laser illuminations to produce the red, green, and blue arrays of pixels. The optical projection arrangement 83 projects the red, green, and blue arrays of pixels onto the display screen 56 to produce the color image 56.

According to one embodiment, the apparatus further comprises a fourth optical fiber 53 (FIG. 6A) configured to carry an additional laser illumination, which may variously comprise an additional red, green, or blue laser illumination. The means for modulating the first three laser illuminations will advantageously be used to modulate the fourth laser illumination as well.

The optical projection arrangement 83 preferably includes combining optics 84, separating optics 86, a projection lens 88, and a scanning mirror 90. The combining optics 84 are preferably a dichroic filter group such as a Philips prism block. The separating optics 86 are also known as Schlieren optics. The first, second, and third GLVs, 78, 80, and 82, are optically coupled to the combining optics 84. The combining optics 84 are optically coupled the separating optics 86. The separating optics are coupled to the projection lens 88. The projection lens 88 is optically coupled to the scanning mirror 90. The scanning mirror is optically coupled to the display screen 56. The separating optics 86 preferably include first and second relay lenses, 92 and 94, and a Schlieren stop 96, located between the first and second relay lenses, 92 and 94.

In operation, the first, second, and third GLVs, 78, 80, and 82 produce a red linear array of pixels, a green linear array of pixels, and a blue linear array of pixels, with each pixel in a diffracting mode, including plus one and minus one diffraction orders, $D_{+1}$ and $D_{-1}$, or a reflecting mode R. Note that for illustration purposes FIG. 6 depicts two pixels each having the plus one and minus one diffraction orders, $D_{+1}$ and $D_{-1}$, and the reflecting mode R. In operation, each pixel will normally produce the plus one and minus one diffraction orders, $D_{+1}$ and $D_{-1}$, or the reflecting mode R. If a gray scale effect is desired, a particular pixel is partially modulated to produce both the plus one and minus one diffraction orders, $D_{+1}$ and $D_{-1}$, and the reflecting mode R.

The combining optics 84 direct the red, green, and blue linear arrays of pixels to the separating optics 86. The Schlieren stop 96 of the separating optics 86 stops the reflecting mode R and allows the plus one and minus one diffraction orders, $D_{+1}$ and $D_{-1}$, to pass the Schlieren stop 96. Thus, the red, green, and blue linear arrays of pixels, after passing the Schlieren stop 96, do not include the reflecting mode but do include the plus one and minus one diffraction orders, $D_{+1}$ and $D_{-1}$.

The projection lens 88, via the scanning mirror 90, projects the red, green, and blue linear arrays of pixels onto the display screen 56 to produce a color linear array of pixels on the display screen 56. The scanning mirror 90 is driven by the projector electronics 46 to scan the color linear array of pixels across the display screen 56 to produce the color image 54.

It will be readily apparent to one skilled in the art that any particular lens of the present invention can be a compound lens. It will be also be readily apparent to one skilled in the art that any particular lens can be replaced with a reflective optical element or multiple reflective elements. Further, it will be readily apparent to one skilled in the art that the second relay lenses 94 and the Schlieren stop 96 can be configured with the Schlieren stop 96 reflecting the plus one and minus one diffraction orders, $D_{+1}$ and $D_{-1}$, to the second relay lens 94.

A first alternative projector head of the present invention uses the first GLV 78 to produce a monochrome image on the display screen 56. The first alternative projector head does not include the second or third GLVs, 80 and 82, nor the combining optics 84. The first GLV 78 of he first alternative projector head modulates a single laser illumination to produce a single linear array of pixels, which is projected onto the display screen 56 and scanned across the display screen 56 to produce the monochrome image.

A second alternative projector head of the present invention uses the first GLV 78 to produce the color image 54 on the display screen 56. The second alternative projector head does not include the second or third GLVs, 80 and 82. In the second alternative projector head, the combining optics sequentially combines the red, green, and blue laser illuminations from the first, second, and third micro-lens arrays to sequentially illuminate the first GLV 78. Thus, the second alternative projector head sequentially projects and scans the red, green, and blue linear arrays of pixels onto and across the display screen 56 to produce the color image 54.

A third alternative projector head of the present invention replaces the first, second, third GLVs, 78, 80, and 82, with first, second, and third reflective light valve arrays and does not include the Schlieren stop 96. Other light valves can also be used such as LCD or DMD. The first, and second, and third reflective light valve arrays produce the red, green, and blue linear arrays of pixel by reflecting light to the first relay lens 92 for a bright pixel and by reflecting light away form the first relay lens 92 for a dark pixel. Thus, the third alternative projector head of the present invention projects and scans the red, green, and blue linear arrays of pixels onto and across the display screen 56 to produce the color image 54.

A fourth alternative projector head of the present invention replaces the first, second, third GLVs, 78, 80, and 82, with first, second, and third transmissive light valve arrays and does not include the Schlieren stop 96. The first, and second, and third transmissive light valve arrays produce the red, green and blue linear arrays of pixels by transmitting light to the first relay lens 92 for a bright pixel and by directing light away form the first relay lens 92 for a dark pixel. Thus, the fourth alternative projector head of the present invention projects and scans the red, greet and blue linear arrays of pixels onto and across the display screen 56 to produce the color image 54.

Figure 7:
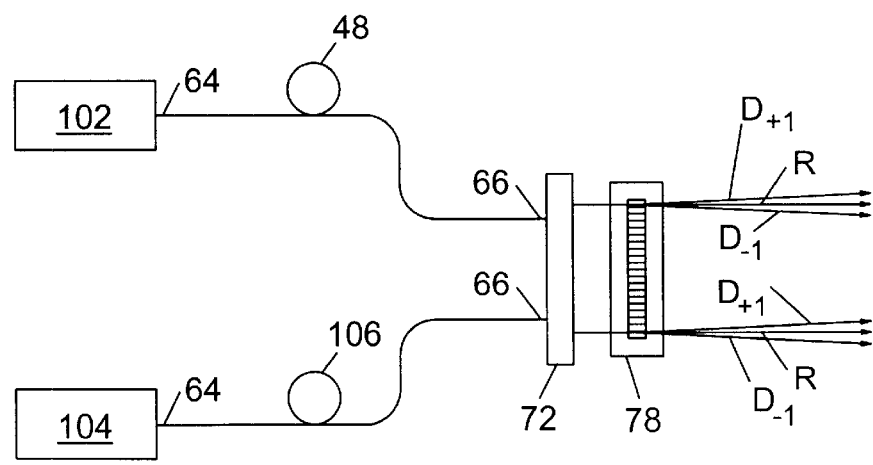
FIG. 7 illustrates an alternative illumination arrangement for the GLV using multiple lasers of the present invention.

FIG. 7 illustrates an alternate arrangement of first and second lasers, 102 and 104, illuminating the first GLV 78 of the present inventions. The first and second lasers, 102 and 104, are coupled to the first optical fiber 48 and a fourth optical fiber 106. The first and fourth optical fibers, 102 and 104, are coupled to the first micro-lens array, which illuminates the first GLV 78. Thus combining the output of multiple lasers onto a single GLV channel and thus provides for modular illumination. This allows even bright projection systems as advances are made in the efficiency of one color laser by using multiple lasers of one intensity and combining their output to achieve a higher effective illumination intensity. It also allows lasers of different output intensities to be used in a single system. For example, if red lasers are substantially brighter than blue lasers, the laser light output from more than one blue laser can be combined to achieve the brightness available from a brighter red laser.

It will be readily apparent to one skilled in the art that other various modifications may be made to the preferred embodiment without departing from the spirit and scope of the invention as defined by the appended claims.

I claim:

1. An apparatus for projecting an image onto a display screen comprising:
   a. an optical fiber configured to carry a laser illumination to a downstream end of the optical fiber;
   b. a projector head comprising:
      i. a light modulator driven by electronic means, wherein the downstream end of the optical fiber is coupled to the light modulator such that the light modulator modulates the laser illumination to produce an array of modulated pixels collectively comprising a first and second mode of laser light coming from the light modulator according to a control of the electronic means; and
      ii. an optical projection arrangement coupled to the light modulator such that the optical projection arrangement projects the array of pixels onto the display screen to produce the image; and
   c. a laser source unit for producing laser illumination, wherein the laser source unit is optically coupled and mechanically isolated from the projector head.

2. The apparatus of claim 1 further comprising a micro-lens arrangement coupled to the downstream end of the optical fiber and configured such that the micro-lens arrangement couples the laser illumination to the light modulator.

3. The apparatus of claim 2 further comprising a laser driven by the electronic means and coupled to an upstream end of the optical fiber such that the laser provides the laser illumination.

4. The apparatus of claim 1 further comprising an additional optical fiber configured to carry an additional laser illumination to the downstream end of the additional optical fiber such that the light modulator modulates the laser illumination and the additional laser illumination.

5. The apparatus of claim 1 wherein the light modulator comprises a diffractive light valve.

6. The apparatus of claim 5 wherein the diffractive light valve comprises a grating light valve.

7. The apparatus of claim 6 wherein:
   a. the array of pixels produced by the grating light valve comprises a linear array of pixels;

b. the first and second modes of laser light respectively comprise the diffracted mode and the reflected mode; and c. the optical projection arrangement comprises:
  i. separating optics which allow the diffracted portion of diffracted and reflected light coming from the grating light valve to pass the separating optics;
  ii. projection optics which project the linear array of pixels onto the display screen; and
  iii. scanning optics driven by the electronic means such that the scanning optics scans the linear array of pixels over the display screen to produce the image.

8. The apparatus of claim 1 wherein the light modulator comprises a reflective light modulator.

9. The apparatus of claim 1 wherein the light modulator comprises a transmissive light modulator.

10. The apparatus according to claim 1 wherein the first and second mode are selected from a group consisting of reflected and diffracted modes, reflected toward and reflected away modes, and a transmissive mode and a non-transmissive mode.

11. An apparatus for projecting a color image onto a display screen comprising:
  a. a red laser source for producing a red laser illumination;
  b. a blue laser source for producing a blue laser illumination;
  c. a green laser source for producing a green laser illumination;
  d. a first optical fiber configured to carry the red laser illumination to a first downstream end of the first optical fiber;
  e. a second optical fiber configured to carry the green laser illumination to a second downstream end of the second optical fiber;
  f. a third optical fiber configured to carry the blue laser illumination to a third downstream end of the third optical fiber;
  g. a projector head comprising:
    i. means for modulating light which is driven by electronic means and coupled to the first, second, and third downstream ends of the first, second, and third optical fibers such that the means for modulating light modulates the red, green, and blue laser illuminations to produce red, green, and blue arrays of modulated pixels collectively comprising a first and second mode of laser light coming from the light modulator according to a control of the electronic means; and
    ii. an optical projection arrangement coupled to the light modulator such that the optical projection arrangement projects the red, green, and blue arrays of pixels onto the display screen to produce the color image; wherein the red laser source, the blue laser source, and the green laser source are optically coupled and mechanically isolated from the projector head.

12. The apparatus of claim 11 further comprising:
  a. a first micro-lens arrangement coupled to the first downstream end of the first optical fiber and configured such that the first micro-lens arrangement couples the red laser illumination to the means for modulating light;
  b. a second micro-lens arrangement coupled to the second downstream end of the second optical fiber and configured such that the second micro-lens arrangement couples the green laser illumination to the means for modulating light; and
  c. a third micro-lens arrangement coupled to the third downstream end of the third optical fiber and configured such that the third micro-lens arrangement couples the blue laser illumination to the means for modulating light.

13. The apparatus of claim 12 further comprising:
  a. a red laser driven by the electronic means and coupled to a first upstream end of the first optical fiber such that the red laser provides the red laser illumination;
  b. a green laser driven by the electronic means and coupled to a second upstream end of the second optical fiber such that the green laser provides the green laser illumination; and
  c. a blue laser driven by the electronic means and coupled to a third upstream end of the third optical fiber such that the blue laser provides the blue laser illumination.

14. The apparatus of claim 11 further comprising a fourth optical fiber configured to carry an addition laser illumination selected from the group consisting of an additional red, green, and blue laser illuminations to a fourth downstream end of the fourth optical fiber such that the means for modulating light modulates the red, green, and blue laser illuminations and the additional laser illumination.

15. The apparatus of claim 11:
  a. wherein the means for modulating light comprises a red light modulator, a green light modulator, and a blue light modulator; and
  b. further wherein:
    i. the red light modulator modulates the red laser illumination to produce the red array of pixels;
    ii. the green light modulator modulates the green laser illumination to produce the green array of pixels; and
    iii. the blue light modulator modulates the blue laser illumination to produce the blue array of pixels.

16. The apparatus of claim 15 wherein:
  a. the red light modulator comprises a red diffractive light valve;
  b. the green light modulator comprises a green diffractive light valve; and
  c. the blue light modulator comprises a blue diffractive light valve.

17. The apparatus of claim 16 wherein:
  a. the red diffractive light valve comprises a red grating light valve;
  b. the green diffractive light valve comprises a green grating light valve; and
  c. the blue diffractive light valve comprises a blue grating light valve.

18. The apparatus of claim 17 wherein:
  a. the red array of pixels produced by the red grating light valve comprises a red linear array of pixels;
  b. the green array of pixels produced by the green grating light valve comprises a green linear array of pixels,
  c. the blue array of pixels produced by the blue grating light valve comprises a blue linear array of pixels; and
  d. the optical projection arrangement comprises:
    i. combining optics which combine diffracted and reflected light coming from the red, green and blue grating light valves, the combining optics forming a color linear array of pixels comprising the red, green, and blue linear arrays of pixels;
    ii. separating optics which allow a diffracted portion of the diffracted and reflected light coming from the red, green, and blue grating light valves to pass the separating optics;

iii. projection optics which project the color linear array of pixels onto the display screen; and iv. scanning optics driven by the electronic means such that the scanning optics scan the color linear array of pixels over the display screen to produce the color image.

19. The apparatus of claim 18 further comprising:

a. a first micro-lens arrangement coupled to the first downstream end of the first optical fiber and configured such that the first micro-lens arrangement couples the red laser illumination to the means for modulating light;

b. a second micro-lens arrangement coupled to the second downstream end of the second optical fiber and configured such that the second micro-lens arrangement couples the green laser illumination to the means for modulating light; and c. a third micro-lens arrangement coupled to the third downstream end of the third optical fiber and configured such that the third micro-lens arrangement couples the blue laser illumination to the means for modulating light.

20. The apparatus of claim 15 wherein:

a. the red light modulator comprises a red reflective light modulator;

b. the green light modulator comprises a green reflective light modulator; and c. the blue light modulator comprises a blue reflective light modulator.

21. The apparatus of claim 15 wherein:

a. the red light modulator comprises a red transmissive light modulator;

b. the green light modulator comprises a green transmissive light modulator; and c. the blue light modulator comprises a blue transmissive light modulator.

22. The apparatus of claim 11 wherein the means for modulating light comprises a diffractive light valve.

23. The apparatus of claim 11 wherein the means for modulating light comprises a reflective light modulator.

24. The apparatus of claim 11 wherein the means for modulating light comprises a transmissive light modulator.

25. The apparatus of claim 22, 23, 24 wherein the diffractive light valve comprises a grating light valve.

26. The apparatus of claim 25:

a. wherein the grating light valve comprises a linear grating light valve; and b. further comprising:

i. means for sequentially illuminating the grating light valve driven by the electronic means such that the means for sequentially illuminating causes the red, green, and blue laser illuminations to sequentially illuminate the grating light valve to sequentially produce a red linear array of pixels, a green linear array of pixels, and a blue linear array of pixels, whereby a line sequential color is produced, the means for sequentially illuminating repeatedly producing the line sequential color;

ii. separating optics which allow a diffracted portion of diffracted and reflected light coming from grating light valve to pass the separating optics;

iii. projection optics which project the red, green and blue linear arrays of pixels onto the display screen; and iv. scanning optics driven by the electronic means such that the scanning optics scan the line sequential color over the display screen to produce the color image.

27. The apparatus according to claim 11 wherein the first and second mode are selected from a group consisting of reflected and diffracted modes, reflected toward and reflected away modes, and a transmissive mode and a non-transmissive mode.

28. An apparatus for projecting a color image comprising:

a. first, second and third optical fibers, the first optical fiber transmitting a red laser light to a first fiber end, the second optical fiber transmitting a green laser light to a second fiber end, the third optical fiber transmitting a blue laser light to a third fiber end;

b. a red laser source unit for generating the red laser light, configured such that the red laser light is transmitted into a source end of the first optical fiber;

c. a green laser source unit for generating the green laser light, configured such that the green laser light is transmitted into a source end of the second optical fiber;

d. a blue laser source unit for generating the blue laser light, configured such that the blue laser light is transmitted into a source end of the third optical fiber;

e. a projector head comprising:

i) first, second, and third micro-optics, the first micro-optics coupled to the first fiber end, the second micro-optics coupled to the second fiber end, and the third micro-optics coupled to the third fiber end;

ii) first, second, and third grating light valves each driven by electronic means, the first grating light valve coupled to the first micro-optics and illuminated by the red laser light to produce a red linear array of pixels, the second grating light valve coupled to the second micro-optics and illuminated by the green laser light to produce a green linear array of pixels, and the third grating light valve coupled to the third micro-optics and illuminated by the blue laser light to produce a blue linear array of pixels;

iii) combining optics combining diffracted and reflected light coming from the first, second, and third grating light valves, the combining optics forming a color linear array of pixels comprising the red, green, and blue linear arrays of pixels;

iv) separating optics coupled to the combining optics and allowing a diffracted portion of the diffracted and reflected light to pass the separating optics;

v) projection optics projecting the color linear array of pixels onto a display screen; and vi) scanning optics driven by the electronic means and scanning the color linear array of pixels over the display screen to produce the color image, wherein the projector head is optically coupled to and mechanically isolated from the red laser source unit, the green laser source unit and the blue laser source unit.

29. An apparatus for projecting a color image comprising:

a. first, second and third optical fibers, the first optical fiber transmitting a red laser light to a first fiber end, the second optical fiber transmitting a green laser light to a second fiber end, the third optical fiber transmitting a blue laser light to a third fiber end;

b. a red laser source unit for generating the red laser light, configured such that the red laser light is transmitted into a source end of the first optical fiber;

c. a green laser source unit for generating the green laser light, configured such that the green laser light is transmitted into a source end of the second optical fiber;

d. a blue laser source unit for generating the blue laser light, configured such that the blue laser light is transmitted into a source end of the third optical fiber; and e. a projector head comprising:
   i) first, second, and third micro-optics, the first micro-optics coupled to the first fiber end, the second micro-optics coupled to the second fiber end, and the third micro-optics coupled to the third fiber end;
   ii) combining optics coupled to the first, second, and third micro-optics;
   iii) means for sequentially illuminating the combining optics such that the red, green, and blue laser light sequentially and repeatedly illuminates the combining optics;
   iv) a grating light valve driven by electronic means and coupled to the combining optics such that the red, green, and blue laser light sequentially and repeatedly illuminate the grating light valve, the grating light valve producing sequential red, green, and blue linear arrays of pixels in response to the illumination by the red, green, and blue laser light;
   v) separating optics coupled to the grating light valve and allowing a diffracted portion of diffracted and reflected light to pass the separating optics;
   vi) projection optics projecting the sequential red, green, and blue linear array of pixels onto a display screen; and
   vii) scanning optics driven by the electronic means and scanning the sequential red, green, and blue linear array of pixels over the display screen to produce the color image, wherein the projector head is optically coupled to and mechanically isolated from the red laser source unit, the green laser source unit and the blue laser source unit.

* * * * *